US011346325B2

(12) United States Patent
Nes

(10) Patent No.: US 11,346,325 B2
(45) Date of Patent: May 31, 2022

(54) LOCATION OF TURBINES IN A MATRIX RIG AND TRANSPORT OF ENERGY, AS WELL AS ONE METHOD FOR MOUNTING TURBINES WITH ASSOCIATED PROPELLER SET

(71) Applicant: WIND CATCHING SYSTEMS AS, Bergen (NO)

(72) Inventor: Asbjørn Nes, Veitastrond (NO)

(73) Assignee: WIND CATCHING SYSTEMS AS, Bergen (NO)

( * ) Notice: Subject to any disclaimer, the term of this patent is extended or adjusted under 35 U.S.C. 154(b) by 0 days.

(21) Appl. No.: 17/044,795

(22) PCT Filed: Mar. 7, 2019

(86) PCT No.: PCT/NO2019/000007
§ 371 (c)(1),
(2) Date: Oct. 1, 2020

(87) PCT Pub. No.: WO2019/172773
PCT Pub. Date: Sep. 12, 2019

(65) Prior Publication Data
US 2021/0199093 A1    Jul. 1, 2021

(30) Foreign Application Priority Data

Mar. 9, 2018  (NO) .................................. 20180349
Feb. 15, 2019 (NO) .................................. 20190234

(51) Int. Cl.
F03D 9/32    (2016.01)
F03D 1/02    (2006.01)
(Continued)

(52) U.S. Cl.
CPC ............... F03D 13/25 (2016.05); F03D 1/02 (2013.01); F03D 13/10 (2016.05); F03D 13/20 (2016.05);
(Continued)

(58) Field of Classification Search
CPC ........... F03D 13/25; F03D 9/32; B63B 35/44
See application file for complete search history.

(56) References Cited

U.S. PATENT DOCUMENTS 1,876,595 A     9/1932  Beldimano
6,100,600 A *   8/2000  Pflanz ...................... F03D 9/25
                                                  290/54
(Continued)

FOREIGN PATENT DOCUMENTS

CN    101666289 A    3/2010
CN    104279120 A    1/2015
(Continued)

OTHER PUBLICATIONS

International Search Report and Written Opinion for PCT/NO2019/000007 dated May 14, 2019.
(Continued)

*Primary Examiner* — Justin D Seabe
(74) *Attorney, Agent, or Firm* — ArentFox Schiff LLP

(57) ABSTRACT

A wind turbine comprising a frame on a floating pontoon, wherein the frame is constructed as a lattice rig upright on the pontoon forming a plurality of rectangular or square openings in the rig for receiving respective interchangeable wind turbine generators with associated drive propellers driven by incoming wind, and each wind turbine generator being arranged to travel up the rear of the rig and through the openings towards the front of the rig. The wind power plant is characterized in that each turbine generator comprises one or more pairs of propeller blades forming a propeller set
(Continued)

having a blade diameter defining the turbine rotational plane, each propeller set is arranged at a distance from the front side of the rig to be rotated by the incoming wind towards the rig. There is also described a method for mounting turbines with associated propeller sets and openings in the rig, respectively.

11 Claims, 8 Drawing Sheets

(51) Int. Cl.
    *F03D 13/25*     (2016.01)
    *F03D 13/10*     (2016.01)
    *F03D 13/20*     (2016.01)

(52) U.S. Cl.
    CPC ...... *F05D 2220/30* (2013.01); *F05D 2230/60* (2013.01)

(56) References Cited

U.S. PATENT DOCUMENTS

| | | | |
|---|---|---|---|
| 6,294,844 B1* | 9/2001 | Lagerwey | F03D 13/25 290/55 |
| 7,075,189 B2* | 7/2006 | Heronemus | F03D 9/255 290/44 |
| 8,487,471 B2* | 7/2013 | Barber | B63B 21/48 290/55 |
| 8,931,235 B2* | 1/2015 | Baker | F03D 9/25 52/745.17 |
| 9,567,979 B2* | 2/2017 | Goessling | F03D 7/026 |
| 2007/0138021 A1* | 6/2007 | Nicholson | B63J 3/04 205/628 |
| 2010/0140949 A1* | 6/2010 | Pitre | F03D 13/20 290/55 |
| 2013/0067853 A1 | 3/2013 | Baker | |

FOREIGN PATENT DOCUMENTS

| | | | | |
|---|---|---|---|---|
| WO | WO-2007009464 A1 * | 1/2007 | | F03D 9/10 |
| WO | 2010150248 A2 | 12/2010 | | |
| WO | 2016122327 A1 | 8/2016 | | |
| WO | WO-2016122327 A1 * | 8/2016 | | B63B 35/44 |
| WO | 2017008818 A1 | 1/2017 | | |
| WO | 2017108040 A1 | 6/2017 | | |

OTHER PUBLICATIONS

European Search Report issued in corresponding European Application No. 19 76 5095 dated Oct. 12, 2021.

* cited by examiner

LOCATION OF TURBINES IN A MATRIX RIG AND TRANSPORT OF ENERGY, AS WELL AS ONE METHOD FOR MOUNTING TURBINES WITH ASSOCIATED PROPELLER SET

RELATED APPLICATIONS

The present application is a 35 U.S.C. 371 National Stage application of International Patent Application No. PCT/NO2019/000007, which was filed on Mar. 7, 2019 and claims the priority of Norwegian Patent Application No. 2019 0234 filed on Feb. 15, 2019, and Norwegian Patent Application No. 2018 0349 filed on Mar. 9, 2018, the disclosure content of each is hereby incorporated by reference into the present application.

TECHNICAL FIELD

The present invention relates to the location of turbines in a matrix rig and transport of energy, and a method for mounting turbines with associated propeller sets.

BACKGROUND OF THE INVENTION

Offshore wind technology is undergoing rapid development. Most of the development has been about producing ever larger and larger turbines mounted on a mast that has been standing on the seabed or floating in cylindrical floats such as the Hywind system.

Many professionals in the industry are nevertheless skeptical of this development and believe that so-called multi-rotor systems can be a better solution, as shown in text and figures in said Norwegian patent NO 341.700.

Wind Catching Systems, as described in the NO patent, is a so-called multi-rotor system in which many turbines with associated propellers are placed in a matrix form in a rig (also called a sail). Each turbine in the rig is located in approximately square or rectangular openings (light openings) in the rig and a funnel tapers the wind stream so that all wind must pass through the circular hole where the turbine with its turbine blades sits. In practice, this means that the funnel's largest opening is at least 30% larger than the opening there the turbine is mounted. The rig is arranged to float on the sea mounted on one or more pontoons and according to a favorable alternative of three parallel pontoons forming a so-called trimaran according to NO341700. The rig is anchored by means of suitable anchor lines (chains) (not shown) to the seabed or landfill.

This is a system that will undoubtedly work, but there are still some challenges with the system that are not particularly desirable. It can be very demanding to design the rig and inlet funnels properly and regardless of design, the system will result in undesirable high drag, that is, wind load on the rig's structures, which in turn will propagate to the system's anchor systems. Undesirable high drag will of course also result in less energy production from the turbines.

SUMMARY

The present invention relates to the location and installation of the wind turbines in a matrix rig for the production of wind energy and the construction of the rig. The invention thus relates to a wind turbine comprising a frame on a floating pontoon where the frame is constructed as a grid-shaped rig erected on the pontoon which forms a plurality of rectangular or square openings in the rig for receiving respective interchangeable wind turbine generators with associated drive propellers driven by incoming wind, and where each wind turbine generator is arranged to be moved up the rear of the rig and through the openings towards the front of the rig.

A method for mounting turbines with associated propeller sets in a wind power rig is also defined.

The invention also relates to a system for electric energy transport from the matrix rig and down to the underlying deck and further system for electric energy transport from several units and into land and connection to existing networks. The patent application deals with new technology which is a further development of the Norwegian Patent, patent number 341700.

More specifically, the invention aims to be able to use turbine constructions with propeller wings which define a larger plane of rotation than the square opening in/through the rig enables.

An aspect of the invention is to be able to increase the proportion of a wind field entering the front surface of the rig which can be converted to power production via the turbine propellers (blades).

Furthermore, an aspect is to be able to increase the turbine propeller rotation plane while at the same time the opening area in the rig as the turbines with associated propellers remains the same. Accordingly, it is an object of the invention to increase the blade length of the propellers.

Moreover, an aspect is to provide a solution in which each propeller blade is longer than that which, according to the first solution, will normally be able to be inserted into and through the opening area in the rig.

The present invention relates to a new technology related to and further developed with respect to said patent NO341770. The device of the invention is characterized in that each turbine generator comprises one or more pairs of propeller blades which form a propeller set with a blade diameter defining the turbine rotational plane, each propeller set being spaced from the front side of the rig to be rotated by incoming wind toward the rig.

With this invention, a much larger portion of a wind field towards the front of the rig can be utilized for power production, since the turbines can be organized together such that the blade's plane of rotation, viewed from the front, forms a densest possible seal, analogous to a densely sealed ball seal.

By allowing the turbines to be interconnected so that the propeller blades alternately rotate in different planes over the front of the rig, the propellers can collectively occupy the entire maximum energy from an incoming wind field. The propeller's plane of rotation can thus overlap.

According to a preferred solution, the blade length of the propellers can be made longer than the opening space in the rig allows the blades to be hinged, whereby each blade can be pivoted forward during insertion through the opening space. When the turbine and the blades have come sufficiently through the opening and out the front, the blades are swung back and can start the rotation.

The method according to the invention is characterized in that turbines are used with two or four pairs of propeller blades and the propeller blade pairs are adjusted so that they lie along the diagonal or hypotenuse of said openings, and in which position the turbines with propellers are pushed forward through the aperture until the propellers have arrived. in position in a position at a distance above the rig's front plane.

The preferred embodiments are read from claims 16-23.

DETAILED DESCRIPTION

The figures will now be explained in more detail.

Figure 1:
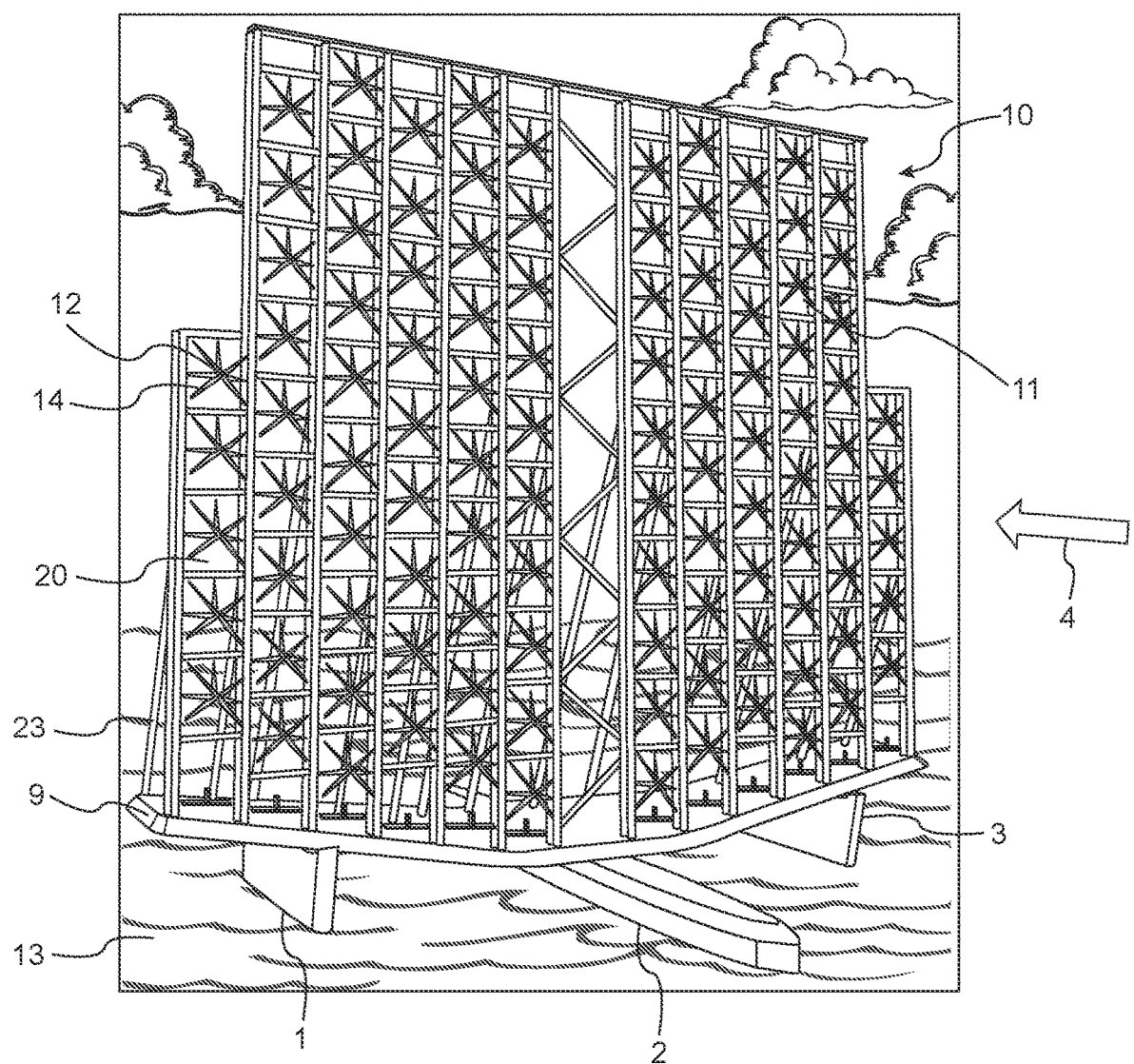
FIG. 1 shows a rig 10 for the wind power plant according to the invention, and viewed obliquely from the front.

FIG. 1 shows a wind turbine rig 10 according to the invention which floats on the sea 13 by means of pontoons 1,2,3. The three parallel pontoons thus form a so-called trimaran, analogous to the float solution according to NO341700 and are anchored by means of suitable anchor lines (chains) (not shown) to the seabed or landfill. The bottom chain is preferably attached in a rotatable turret on the underside of the central pontoon 2, so that the entire structure can rotate against the wind. The rig is upright on the pontoons and is set with its front surface 11 facing the wind direction 40 for operation of the turbines. Each wind turbine 12 with its associated propellers 14 is mounted within its respective light aperture 20 in the rig 10. The propeller 14 is mounted to a shaft 15 which pivots and thereby generates power within the generator of the turbine housing 12.

The rig 10 is made up of vertical towers 16 (stays) and horizontal stiffeners 18, both of which are aerodynamically designed to create the least possible drag/resistance to the wind passing through the rig across front face 11. In practice, each is tower "built up of two round parallel pipes 16 which are interconnected by a truss system of struts 27 (see FIG. 3) for stiffening. Two adjacent towers 16 are connected to horizontal struts 18 of tubular shapes to avoid side forces on the rig when the wind comes in from the front. These forces can be very large and completely unmanageable, unless the towers are designed in this way as outlined here. The openings (light openings) 20 between the towers 16 and the braces 18 and transverse bars 27 are preferably rectangular and particularly square. According to the invention, either two (see FIG. 5) or four propeller blades/rotor blades 14 are used as shown in FIGS. 1, 2, 3 and 4.

The wind generators 12 including propellers 14 are mounted to a frame below each generator 12 and this frame may be attached to respective horizontal stiffeners 18 between each tube 16 or the vertical towers.

The turbines 12 with propellers 14 are set in the corresponding openings 20 in the matrix between vertical pipes 16 and crossbars 18. Each turbine 12 with propellers 14 is fixed in a frame 70 which forms a socket which includes laterally directed struts 72 whose opposite ends extend. 3 and 4, when the turbine 12 in the frame is lifted (from the rear) to the correct height in the rig 12, it is pushed forward. The end pieces of the struts 72 can then be advanced in front. One can then use propeller blades, each with a length of, for example, 16 meters, in a rig with matrix openings of 20×20 meters without problems, that is, a diameter of the propeller of 32 meters the horizontal slots 74 formed on the inside of each tube 16 in the tower. When the frame is pushed forward, the propellers 14 will be located in front of the front surface of the rig. In order to achieve an overlap as mentioned, the turbines are pushed forward to respective different positions over the front of the rig, and still attached to the towers 16 and the side rods 18. When the frame with turbine is pushed to position, it is locked with suitable locking means.

Figure 4:
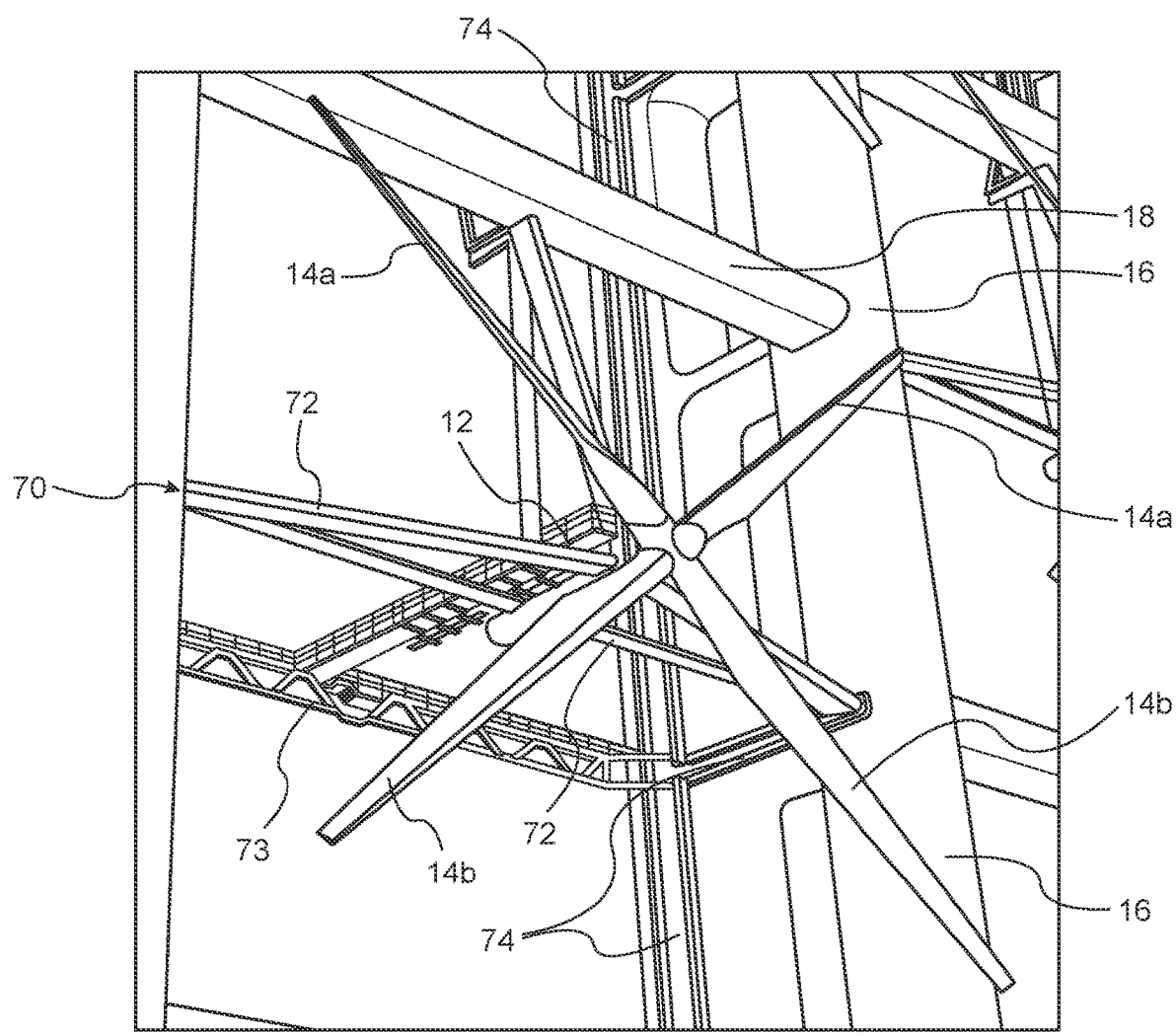
FIG. 4 shows the corresponding side view as FIG. 1, where turbine/propeller has now reached its full position. The figure shows the opening in the rig as the "intersecting" propeller blades 14a, 14b are flush with the diagonal in the opening space so that the turbine unit can be pushed forward to the use position.
Figure 5:
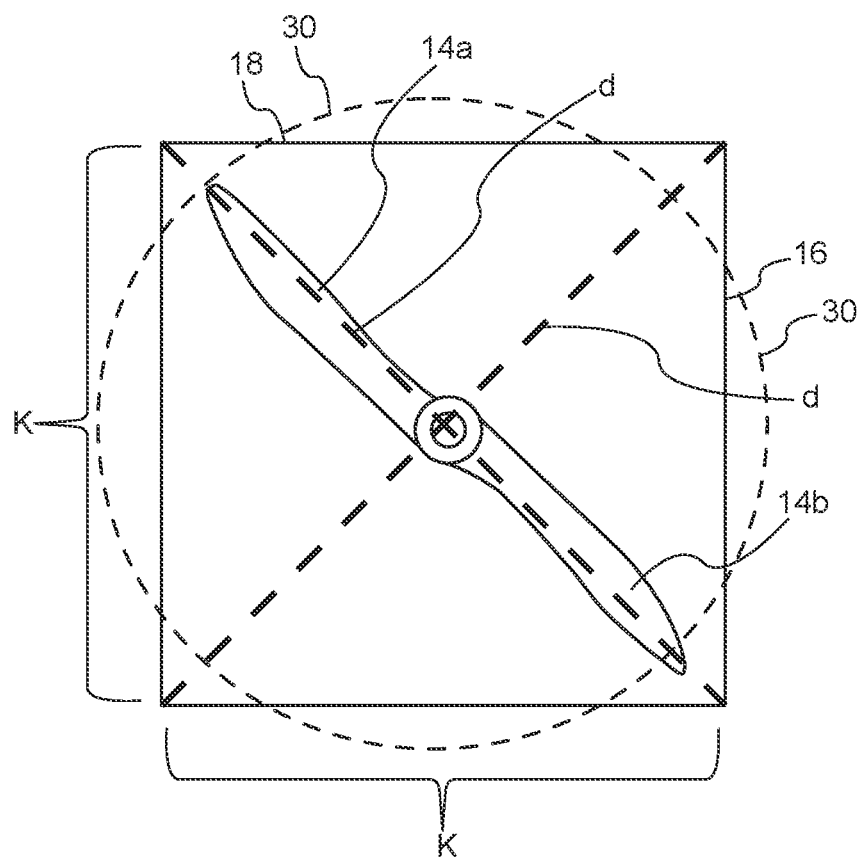
FIG. 5 shows a two-bladed propeller as seen from the front, also to illustrate the term—a plane of rotation 30, as well as the diagonal setting of the propeller blades to advance it through the opening.

According to the invention and as illustrated in FIG. 5 with a two-blade propeller, the propeller blade length is adapted to the diagonal of the associated opening in the rig. When the propeller 14 is displaced through the opening and out the front of the rig, it can be rotated by the wind as in FIG. 4. It can be seen from FIGS. 2, 3 and 4 that the blades form a plane of rotation 30 having a length (diameter) corresponding to the diagonal. d or the hypotenuse in the square, which is thus larger than the square catheter k and thus constitutes a restriction within the rig opening.

Figure 2:
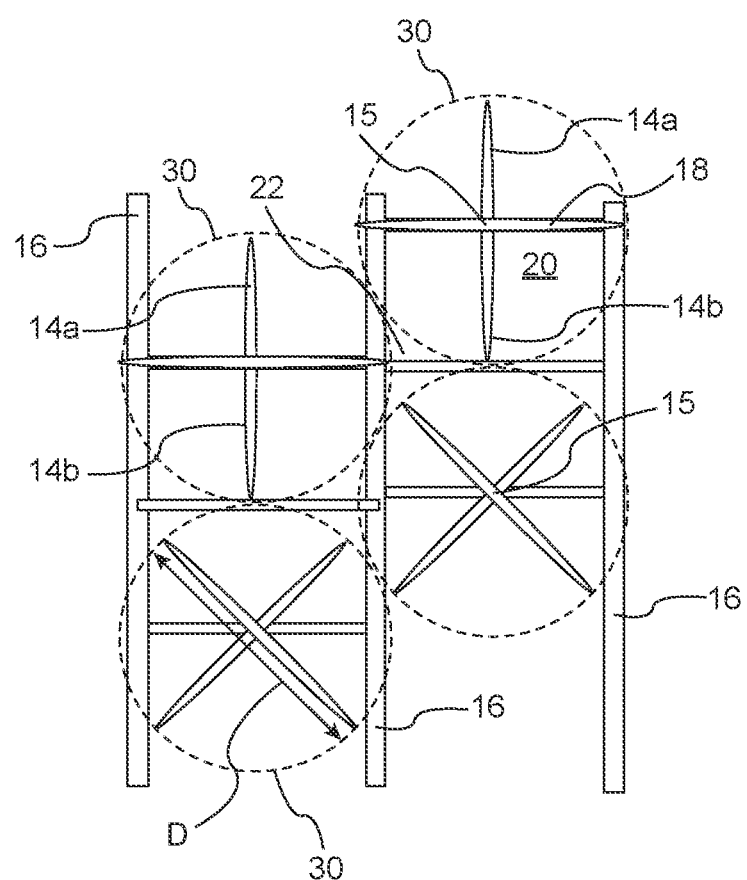
FIG. 2 shows a first preferred mounting of a number of turbines with propellers in a matrix rig, wherein the propellers are arranged in a densest ball seal form, where the propeller tips are almost completely adjacent to each other, without touching each other.
Figure 6:
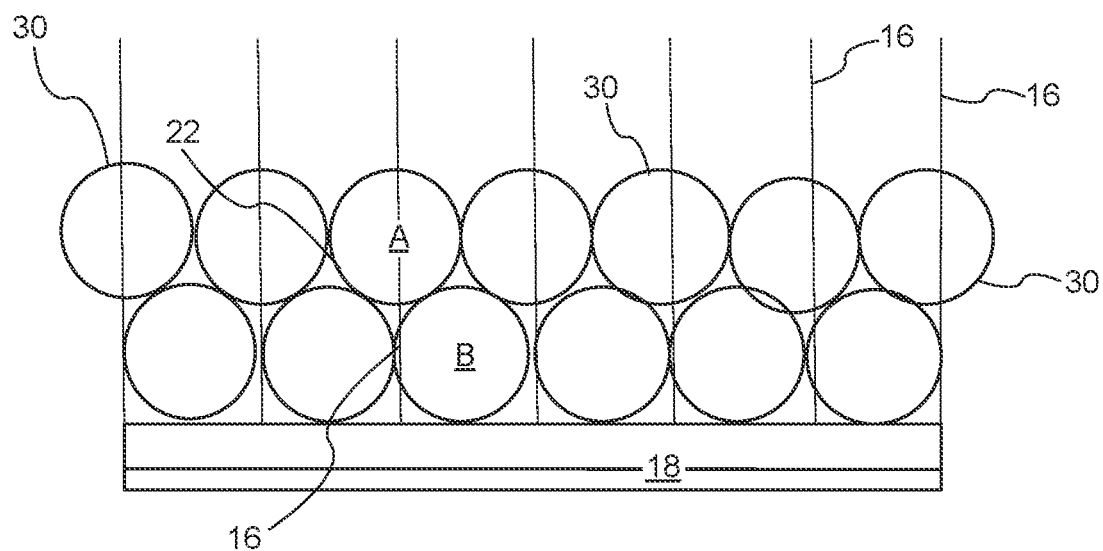
FIG. 6 shows two mutually parallel and horizontal turbine rows A, B forming a densest ball seal.

FIG. 2 shows a preferred stacking of turbines in the rig. The rig 10 is adapted so that turbines/propellers 12/14 are arranged vertically, one above the other. In the next vertical turbine row on each side, the individual turbine sets are offset vertically by a half propeller diameter ½D=d (radius) so that the propeller blades can rotate (rotational plane 30) into the star-shaped space 22 defined by three adjacent propeller shapes. This stacking of turbines is analogous to a densest package of spheres. During assembly, the propeller blades are adjusted along the diagonal of the opening space as explained above. A similar solution is shown in FIG. 6 where the turbines are stacked in line horizontally with each individual turbine set offset horizontally by a half propeller diameter relative to an underlying layer of turbines in the rig.

Figure 3:
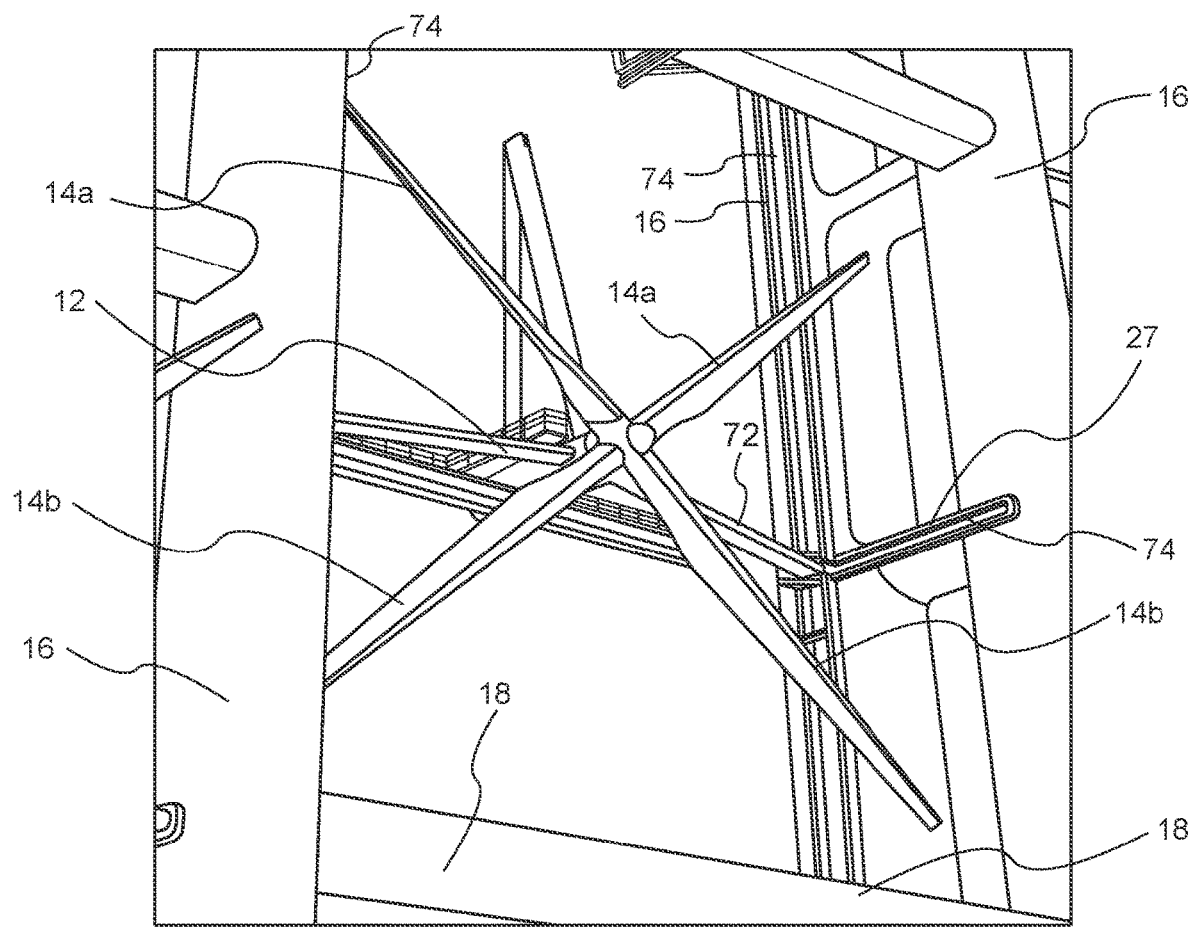
FIG. 3 shows a side view of the rig where a four-leaf propeller is in the process of being introduced forward to its operating position with rotation in a plane rather than the front side of the rig.

FIG. 3 shows an initial mounting of the turbine, i.e., lifted up and ready to be pushed forward to the position of FIG. 4 as is the propeller's operating mode for power generation. The propeller blades are aligned flush with the diagonal in the opening space so that the turbine unit can be pushed forward into the space. FIG. 4 shows that the "intersecting"

propeller blades are aligned with the two diagonals in the square opening space so that the turbine unit can be pushed forward to the position of use.

Figure 7:
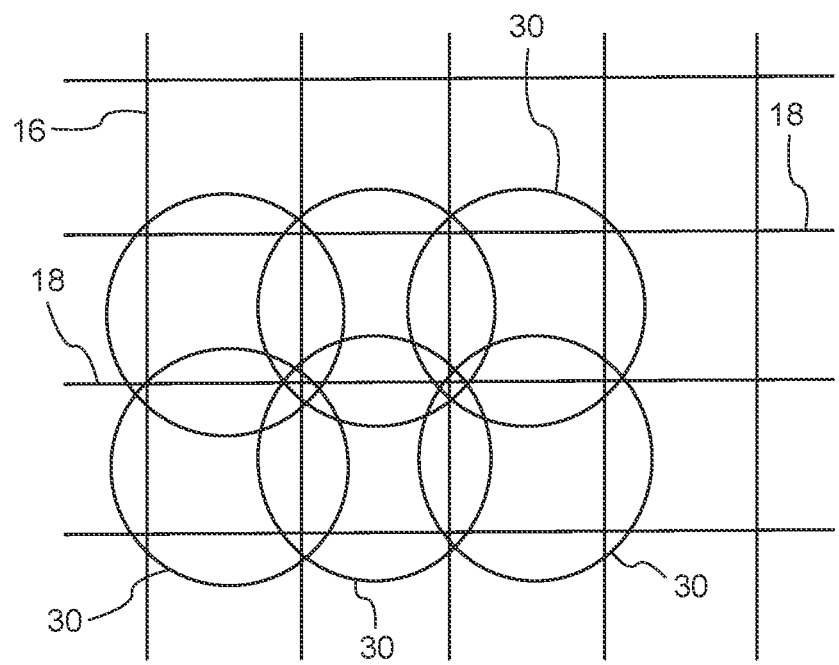
FIG. 7 shows a rig with turbine/propeller as seen from the front, illustrating a construction in which the propeller plane of rotation 30 overlaps.
Figure 8:
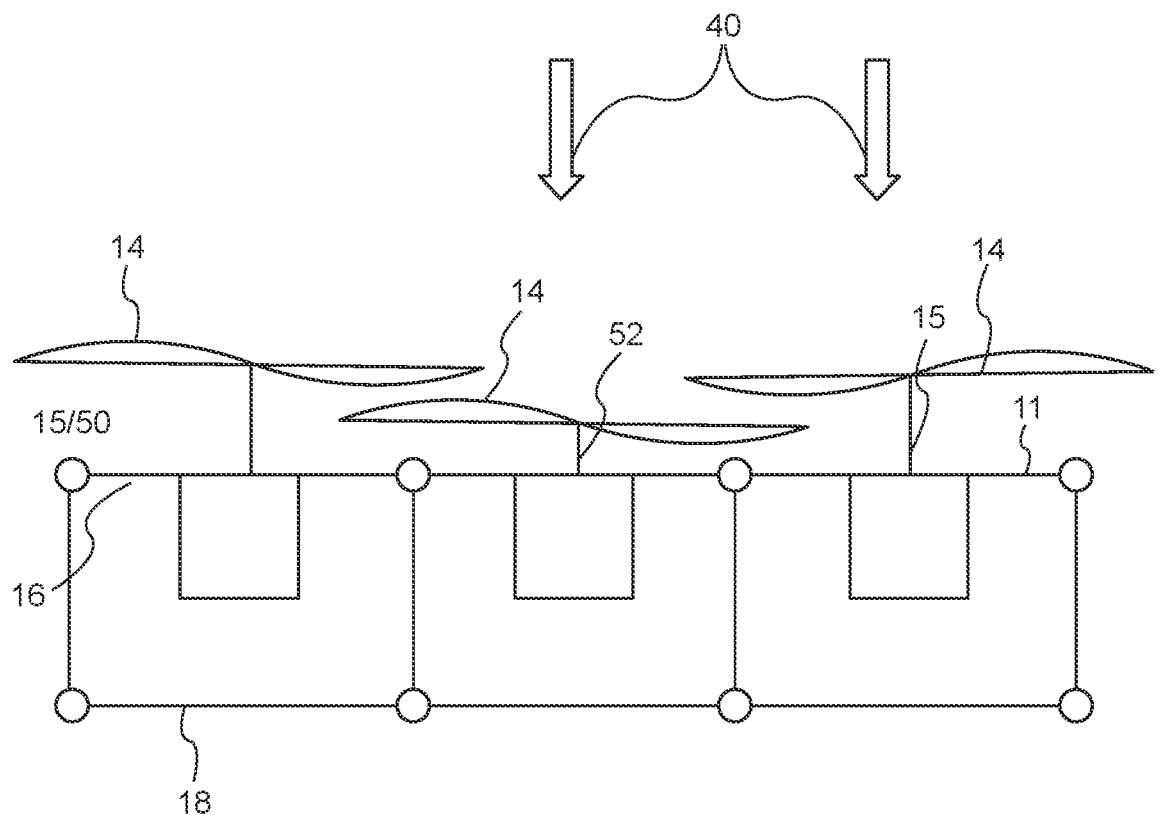
FIG. 8 shows a section of a pan view of the rig with the propellers positioned alternately in front of/behind each other relative to the front of the rig.
Figure 9:
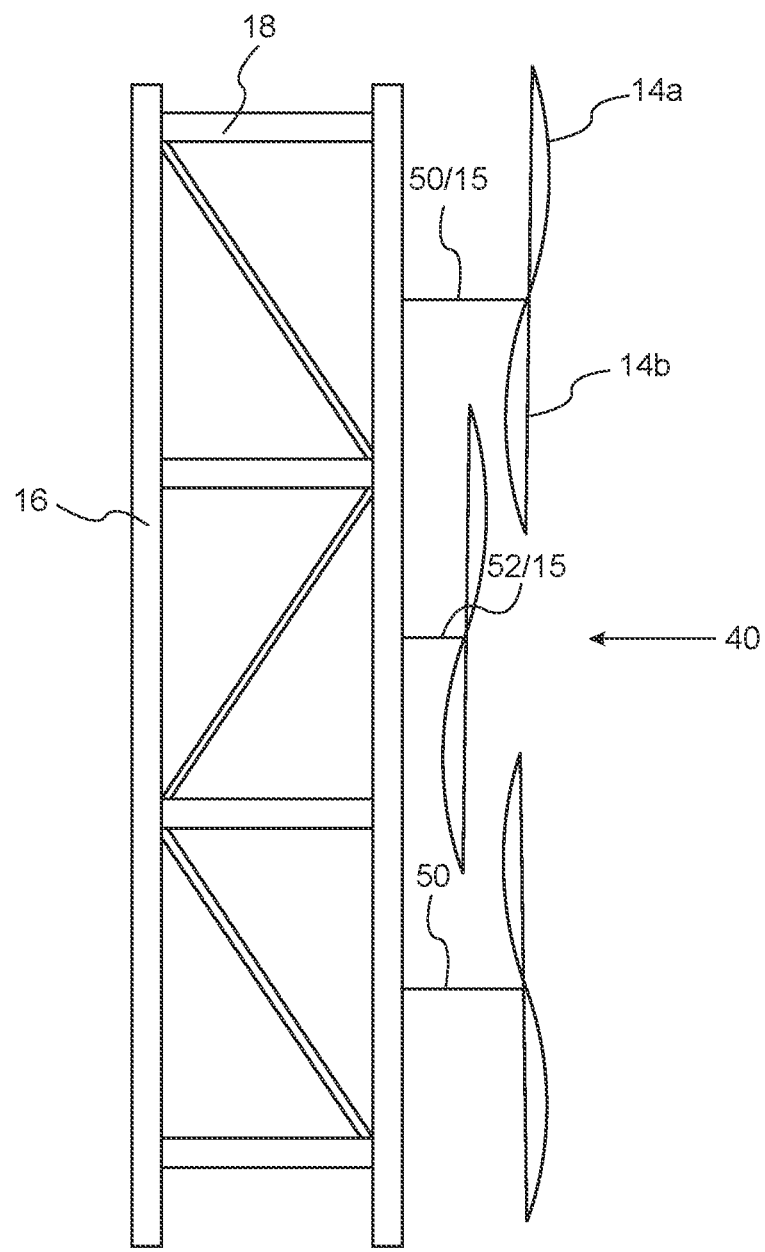
FIG. 9 shows a side view of a corresponding displacement of adjacent propellers as in FIG. 8.
Figure 10:
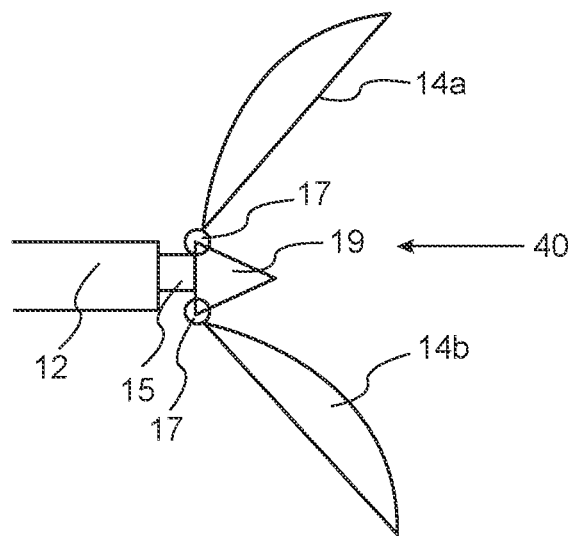
FIG. 10 shows how propellers can be suspended, with the blades tilted forward in order to be guided through the opening in the rig.
Figure 11:
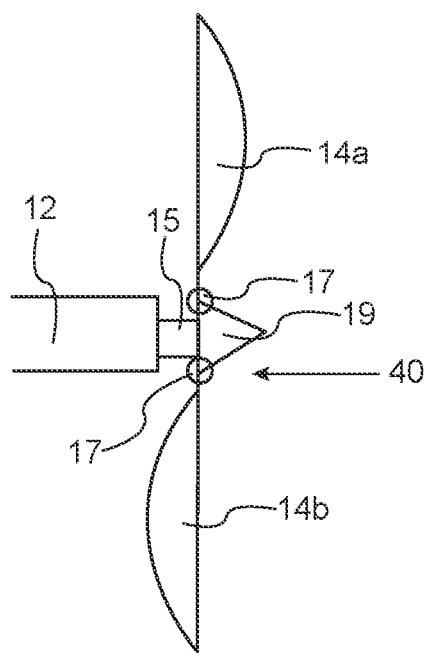
FIG. 11 shows the corresponding propeller, which is now carried out on the front of the rig and the blades are tilted back to their use rotation position.

FIG. 5 shows a variant with a two-blade propeller. The opening space 22 is defined by the pipe columns 16 and the cross beams 18. The floating propeller blades 14a, 14b are adjusted along the diagonal d in the square and can be pushed forward to the position of use, As shown in FIG. 8—a plan view, and FIG. 9—a side view, turbines 12 are mounted offset and positioned alternately forwardly and rearwardly relative to the front face 11 of the rig. They are thus located just in front of the front surface of the rig in mutual distances therefrom, i.e. alternately in distance 50 or distance 52 from the front surface 11. Thereby the turbines achieve overlap, and approximately the entire wind field 40 towards the rig 10 is utilized for power production. FIG. 7 shows large area of propellers with one diameter=32 meters will cover a matrix rig with openings=20×20 meters FIG. 10 shows an embodiment as a solution to the relationship where the propeller diameter is greater/longer than the diagonal in the orifice space and it cannot be pushed through the orifice of the die as in the previous examples. In this case, the solution is that each propeller blade is hinged inside the propeller housing, shown by the number 17. In such a way that each propeller blade can be tilted forward while passing through the die opening. When advanced to the front side 11, the propeller blades are folded back out and locked in this position, as shown in FIG. 11, thereby rotating and producing power as intended. The propellers can then overlap and cover the entire wind field (windshield) 40 which comes in towards the rig. This solution is relevant when the propeller blades are longer than said opening diagonal.

This mechanism can be used when the turbine/propeller folds forward to be pushed through the opening 20, or retracted at the back, for example for turbine/propeller maintenance, etc. When a turbine with associated propeller is to be removed from the rig, the blades are folded. together along the axis and the whole unit can be retracted and removed from the opening.

If we consider a rig—a matrix rig—where the distance between the vertical towers 16 is 20 meters and the distance between the vertical pipe supports 18 is 20 meters, the diagonal (hypotenuse) from corner to corner in the matrix opening will be about 28 meters. This means that a turbine propeller set can have a maximum diameter (about 2×radius=28 meters) if the turbine with its rigidly mounted propeller blades is to be pushed through the rear light opening in the rig, so that the propellers come out on the front side 11 of the rig 10 to rotate and act in front of this front 11. This is one of the details of the invention disclosed in the application.

Discussion of a Preferred Embodiment 1

Rotor blades are used which have a length from the center of the generator of, for example, 13 meters, i.e., the diameter of the propeller is 26 meters from the propeller tip to the opposite directed propeller tip. When the propeller generator is to be hoisted in place, the propeller, which in this case has four blades (it can also have two blades), is placed in a position so that the propeller tips point to the corners of the matrix opening in the rig. When a generator with propeller tips set in position as described above is hoisted in place by the elevator located behind the matrix rig—the rig—(as in patent No. 3,41700), the generator with the propellers is pushed into the matrix opening and it is pushed so far in that the propeller set goes through the entire matrix opening and remains standing at a distance from the front of the rig 11. This means that the propeller can now rotate freely at a distance out from the rig's/rig's front surface, without it touching them vertical towers 16 or the horizontal braces 18. Two mutually adjacent propeller sets are thus positioned with each other—i.e., alternately—different distances from the towers 16 on the front 11 both in the vertical and horizontal planes so as not to collide with each other.

It is obvious that the propellers cannot rotate when the turbine is inside this opening, nor is it the purpose. The object of the invention is to use propellers which give the largest possible rotation plan in use, in that they must act in front of the front of the rig from a propeller tip to the opposite directed propeller tip. If we consider a rig/matrix rig with 100 matrix openings, this rig will typically have a gross wind deflector of 221×233 meters, i.e., 51493 m2. Each turbine will have a porch of 16×16×3.14=803 m2. 100 turbines will then have a windfall of 80,000 m2, but the turbine blades will overlap so that the net windfall will be 51 493 m2+2800 m2 (this is the area that the propellers go outside the towers on the sides and on the top and bottom of the rig. in this example, 54 293 m2 will be.

If the propeller blades are shorter so that they do not overlap during rotation, there will be a relatively large wind field between the propellers which will not be utilized for energy production. This unproductive wind field will in many cases make up more than 25% of the total productive wind field available for electrical energy production. With the solutions of the invention, this unproductive field of action is entirely eliminated by the solution of overlapping circular propeller planes 30 in FIG. 4 and propellers/turbines 12/14 positioned "adjacent" to each other analogously to similar balls in a sealed ball seal.

According to the invention, this problem has been solved in the following manner so that the productive wind field can be increased:

Option 2: shown in FIG. 2.

The vertical matrix openings can be displaced 50% in relation to one another in height direction. Here, the propellers are substantially denser than according to said NO patent, and the unproductive wind field has become substantially smaller. FIGS. 2 and 6 show that the outer portions of each propeller blade will move—rotate—into a triangular space 22 (FIG. 2) between two adjacent rotary propeller blades and without touching each other. Each propeller set with its blades is positioned with its rotation plane analogous to a densest pack of balls.

Option 3 shown in FIG. 6.

In this alternative 3, all the matrix openings are placed side by side horizontally without any mutual height offset. The propeller kits 14 in the rig are placed so that the blades are just not in 2 and 6 show that the associated rotation circles do not touch or touch each other.

In the city, the generators with mounted propellers in every other row are mounted adjacent to one of the vertical towers. We will then get a very tight packing of the turbines and the unproductive wind field will be reduced in the same way as in option 2. The advantage of alternative 3 in relation to option 2 is that with proper planning can get almost half the propeller on either side of the rig's front plane or surface to sweep outside the rig's vertical side tower. This will give a considerable extra windfall outside the rig's outer edges and lead to a significantly increased energy production without the cost of the power plant increasing to any great extent. In many ways, a free extra windshield for energy production.

Although the solution according to option 1 can be the simplest purely structural and thus economical, the other two solutions in all will also. 2 and everything. 3 function as intended.

Internal Energy Transport in the Matrix Rig

It can be challenging and, first of all, very expensive to establish a conventional system for transporting electric energy from the turbines in the matrix rig and down to the power plant deck for further transport to land.

Of course, the challenge will be solved with traditional copper cables from each turbine. However, because the turbines produce much current with relatively low voltage, large voltage losses will easily occur in the cables and it will be very costly to dimension conventional cables so that voltage losses and subsequent energy losses do not occur.

In the matrix rig according to the invention, therefore, the transport of electric energy from the turbines in the rig and down to the power plant deck and further to conversion equipment and/or transformers is solved in the following manner:

Insulating pipes are first mounted, preferably inside the towers. The insulating pipes extend from each turbine or perhaps from each matrix opening and down to the deck and further to the conversion equipment or transformers. Aluminum rails are then preferably mounted as circular cylinders inside the pipes. These aluminum profiles are now conductors and because they are simple and inexpensive to design, they can easily get a dimension that completely prevents voltage drops and energy losses from the turbines and down to the conversion equipment.

Of course, one will also be able to use only conductive rails, preferably in aluminum, preferably with cylindrical profile, where the rails will only be point-insulated, for example, inside the towers and further down to conversion equipment/transformers. When power strips of such lengths as will be relevant to this patent application are to be used, joining of the rails can be challenging if one is to avoid voltage and power loss at the joints. One can of course use regular staples, but this is not a satisfactory solution.

The preferred solution according to the invention is to use cylindrical profiles, preferably in aluminum (but other metals can also be used). The ice profiles may, for example, have a length of 20 meters. Each rod has external threads at one end and internal threads at the other end. We then could shade the profiles together and get a very good electrical connection between the profiles. One can also imagine that you have profiles with only internal threads and profiles with only external threads and that this is then shot together. In order to further improve the electrical contact between the profiles, one can additionally have an extra nut in the joints that enclose two profiles.

Turbine Solution Selection

In most wind turbines today, alternators are used. This is a solid and well-proven solution that works very well in the stomach. But we see that as it is becoming more and more common to move the current-producing wind turbines farther and farther out of the country, it becomes necessary to convert the alternating current (AC) produced in the sea to DC (DC), in order to avoid too great energy loss in connection with the transfer of electricity to land. This is done on own platforms and is a very expensive process.

When you have many turbines next to each other, as in a matrix rig, one can use another technology that is very simple and very cost-effective.

All the turbines are connected in series. If you use high voltage DC turbines, which, for example, each turbine has a voltage of 6000 Volts and you connect 100 such turbines in a matrix rig, you will have a direct current with a voltage of 600,000 Volt which you can send directly to land over. long distances with minimal energy loss. As we have said, we will avoid the expensive process of transforming the AC and then converting it to DC before it is sent to shore.

But one will also achieve a very significant cost saving in connection with the electricity production in the matrix rig.

Logistics solution for export of energy from several floating wind turbines assembled in a park and to land.

Transport of electric energy from conventional wind farms and to land for connection to existing electricity networks is often an expensive and complicated technology, if the wind farm is located a certain distance from land and existing electricity networks.

You have to transform the voltage into high voltage with a voltage of at least 132 kilovolts. This solution is virtually impossible to make technologically with conventional wind turbines, whether they are fixed or mounted on floating type Hywind. The solution will then be to build own platforms for transformation and possibly rectification from AC to DC of the current. This is a very expensive solution.

The floating wind power plant described in this patent application and the prior patent, Patent No. 341700, makes it possible to find other and simpler and less expensive solutions for the landing of electric energy.

On the power plant's deck and in the hulls, there is ample space for both transformers, converting equipment and possibly rectifying the current from AC to DC, if one wishes to land the current as DC current.

It is therefore possible to prepare the power from each one on the power plant and carry it ashore in a separate cable via a swivel and a turret. In many cases, this will be an expensive solution, since high voltage cables of this dimension buried on the seabed are a very expensive method. It will therefore be a cheaper and simpler solution to collect the power from several flying power plants in a cable and then carry it to shore and connect it to an existing electricity grid.

This is solved according to the invention in the following manner. You first place a floating power plant in the center of a field. This power plant then becomes the central power plant. Around this power station, several power plants are then placed, in this patent application called satellites, for example 4. One will then have a total of 5 power plants in this field that produce electrical energy.

The electrical energy produced by the satellites is connected to the central power plant via the turret and swivel. Inside the central power plant, the energy from all the satellites and the energy produced by the central power plant are interconnected. One can now possibly transform all the current from all the power plants to the desired voltage and one can also optionally run the current through a rectifier if one wants to land the current as direct current/DC. The power (the electrical energy) from all the power plants is now driven out through the same swivel and turret as the power from the satellites entered into the central power plant and earlier ashore and connected to a central network in a high-voltage cable.

With this technology one can thus collect and process electrical energy from many floating wind turbines and land the electric energy in a high-voltage cable without having to build their own expensive platforms for interconnection and transformation and possibly rectification to DC of the current.

It will also be possible to use similar technology if you connect DC turbines in series as described above and collect the energy from several floating wind turbines in one power plant and send the DC current to land.

Bracing the Matrix Rig.

Stiffening the matrix array sideways can be challenging. This could be solved by using two large trusses on the top of the rig/rig, a truss for each tower string.

The invention claimed is:

1. A wind turbine rig, comprising:
   a frame on a floating pontoon where the frame is constructed as a lattice-shaped rig upright on the pontoon forming a plurality of rectangular or square openings in the rig for receiving respective interchangeable wind turbine generators arranged to be moved up a rear side of the rig and through the openings towards a front side of the rig,
   each wind turbine generator comprising a drive propeller set comprising one or more pairs of propeller blades having a blade diameter defining a turbine rotational plane and configured for being driven by incoming wind, and
   each drive propeller set is arranged at a distance in front of the front side of the rig, and is configured to be rotated by the incoming wind towards the rig.

2. The wind turbine rig according to claim 1, wherein said blade diameter is equal to a diagonal of the rectangular or square openings.

3. The wind turbine rig according to claim 1, wherein said blade diameter is longer than a diagonal of the rectangular or square openings.

4. The wind turbine rig according to claim 3, wherein each propeller blade is hingedly connected adjacent to a propeller housing, and is configured to be shifted between a position where they are tilted forward and backward and one unfolded position of use.

5. The wind turbine rig according to claim 4, where each pair of propeller blades are hingedly connected to pass a respective one of the plurality of openings during insertion into the respective one of the plurality of openings.

6. The wind turbine rig according to claim 1, wherein frames define said square opening and turbines comprising a drive propeller set is used, and the blade diameter (d) corresponds to the diagonal or hypotenuse of said square light aperture, so that the propeller can be passed through the rig frame and forward to the front side of the rig and rotated with its rotation circle having a diameter greater than said square opening.

7. The wind turbine rig according to claim 1, wherein the wind turbine generators are mounted in vertical and horizontal rows in the rig, and the turbines in the vertical rows are arranged at different heights in relation to adjacent rows of turbine units in the nearest row, to obtain a denser packing of the turbines, so that each propeller blade can move into a triangular space between two adjacent rotating propeller blades and without touching each other.

8. The wind turbine rig according to claim 1, wherein the wind turbine generators, are mounted in mutually parallel rows wherein the rotation plane of a turbine propeller approximates to the plane of an adjacent propeller, the next turbine array being laterally offset by a corresponding ½ propeller diameter so that each propeller blade can move into a triangular space between two adjacent rotating propeller blades and without touching each other.

9. The wind turbine rig according to claim 1, wherein the wind turbine generators are arranged alternately at different distances from the front side of the rig, so that the circular rotation planes which the propellers form parallel to the front side of the rig overlap each other.

10. The wind turbine rig according to claim 6, wherein every other wind turbine generator in a horizontal or vertical row is provided with a first distance from the front side, while each adjacent turbine unit in the rows is arranged at a second distance from the front side.

11. The wind turbine rig according to claim 6, wherein every other wind turbine generator in a horizontal and vertical row is arranged with a first distance from the front side, while each adjacent turbine unit in the rows is arranged at a second distance from the front side.

* * * * *